Dec. 10, 1935.  E. J. WELLS  2,023,654
ARTIFICIAL TOOTH STRUCTURE
Filed July 7, 1934
FIG.2.  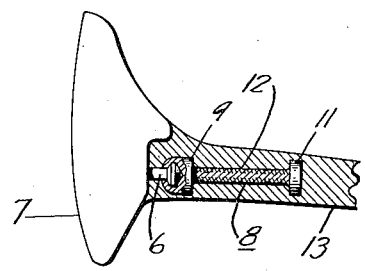  FIG.1.  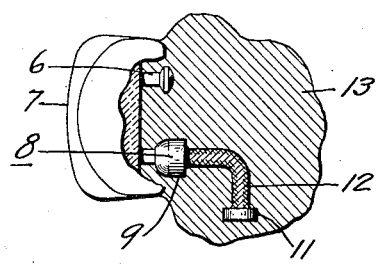

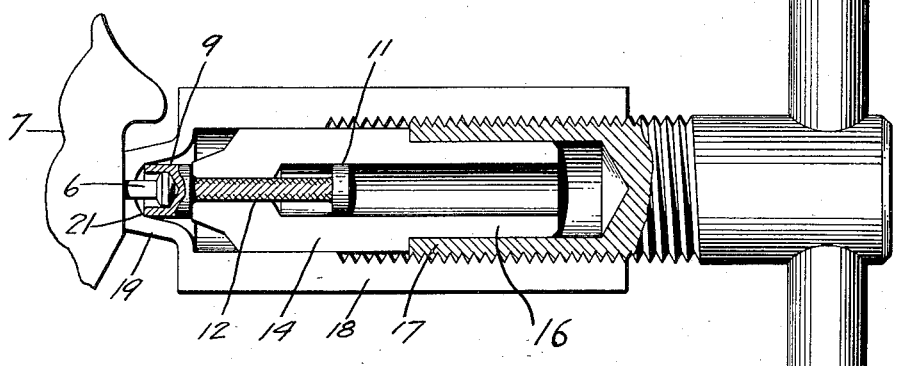
FIG.4.
INVENTOR.
Earl J. Wells
BY Robert N. Eckhoff
ATTORNEY.

Patented Dec. 10, 1935

2,023,654

UNITED STATES PATENT OFFICE 2,023,654

ARTIFICIAL TOOTH STRUCTURE

Earl J. Wells, Alameda, Calif.

Application July 7, 1934, Serial No. 734,086

3 Claims. (Cl. 32—10)

This invention relates to an artificial tooth structure and particularly to means enabling an artificial tooth to be secured more substantially in a dental plate or denture.

Present dental laboratory practice includes the use of artificial teeth embedded partially in the plate, each tooth carrying usually two short headed pins extending into and embedded in the plate material. While this construction is generally satisfactory, in many instances the plate construction is such that it is desirable to secure a tooth more securely than the short pins permit. It has heretofore been proposed to anchor an artificial tooth by such devices as a member hooked over both pins. However, such devices have not proven satisfactory inasmuch as a tooth so fastened works loose in the plate, though it may not drop out, while the denture is weakened, since these devices are bulky. In addition, a number of different sizes and shapes are required since the distance between pins and the relation thereof are not uniform.

It is in general the object of the present invention to improve on the fastening of an artificial tooth in a dental plate.

Another object of the present invention is to provide a simple but effective means for securing an artificial tooth.

A further object of the present invention is to provide for the ready adaptation of an artificial tooth for mounting in a plate in a more secure manner than has been possible heretofore.

The invention possesses other advantageous features and objects some of which, together with the foregoing, will appear at length in the following specification.

In the drawing:

Figure 1 is a plan view of a tooth embodying my invention, partly in section to disclose the structure to better advantage.

Figure 2 is a side elevation, partly in section of the tooth mounted in a plate.

Figure 4 is a side view showing how the pin is engaged with the extension.

Figure 3:
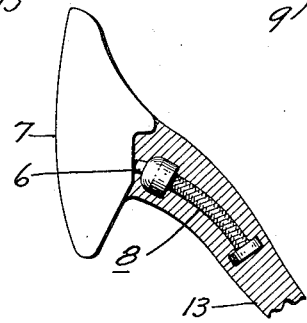
Figure 3 is a side view, partly in section, showing another assembly.

In accordance with this invention, I mount on one of the two-headed pins 6, carried by an artificial tooth 7, an extension, generally indicated by 8. This construction is preferred inasmuch as the tooth thus has two different points of connection with the plate in which it is partially embedded and at different depths from the edge of the plate. I have found this construction more satisfactory than when the two pins are provided with like extensions, although two pins can be used if desired.

The extension 8 comprises a cup or receptacle 9 to receive the head on a pin 6 and one or more discs or flanges 11 connected to the cup by shaft 12. This extension is manufactured as a unit of a suitable metal and the surface of shaft 12 is purposely roughened so as to secure a good bond with plate 13.

The rim of cup 9 is crimped over, as in Figure 2, so that the extension and pin are securely fastened together, the pin and extension being, in effect, integral. This is accomplished by placing shaft 12 between the two jaws 14 of a two-jaw chuck. The shank 16 of the jaws is then slipped into hollow screw 17 and the screw then placed in one-half of body 18 threaded to receive screw 17. At the same time the shank of a pin 6 is fitted into a groove in nose 19 on body 18, the receptacle 9 usually being over the head of pin 6 and abutting against the forward face of the chuck jaws. The other half of body 18 is then placed and the assembled body held in a vise. Upon rotation of screw 17, the rim is forced inwardly about the head of pin 6 by the hardened and curved inner face 21 of nose 19 so that the rim is crimped about the pin and the two are virtually integral. The body 18 is then released from the vise, and separated, and the jaws removed from the screw. The tooth then appears as in Figure 2, ready for mounting in the plate material.

The extension and pin can be bent, as in Figure 3, to enable the tooth to be mounted properly and yet very securely in the denture or the extension alone is bent in the shaft or shank as in Figure 1. The shaft or shank can be variously formed so as to engage the plate material and can include one or more discs or other suitable plate engaging means.

The preferred form of the invention has been disclosed, but other and variant forms can be used within the scope of the claims. Essentially however it is to be noted that the invention contemplates a one piece structure which is so attached to a tooth pin as to be virtually integral therewith. Thus, my cup 9 is so secured to the tooth pin that it cannot be removed without practically removing the tooth pin or a good portion thereof. Integral with the cup is the shaft 12 carrying discs 11. The shaft is employed to secure a depth of embedment in the plate while the discs are used to provide resistance to displacement. The term disc is used herein and in the claims as including any such means on shaft 12.

What is claimed is:

1. An artificial dental plate structure comprising a plate, an artificial tooth partially embedded in said plate and having secured thereto and embedded in said plate a plurality of pins, one of said pins carrying an extension so that said pins are of different lengths for securing said tooth in said plate, said extension being attached to said one pin by a cup placed over said pin and crimped about said pin and including a shaft of a smaller diameter than said cup integral with said cup and extending from said cup into said plate.

2. An artificial dental plate structure comprising a plate, an artificial tooth partially embedded in said plate and having secured thereto and embedded in said plate a plurality of pins, one of said pins carrying an extension so that said pins are of different lengths for securing said tooth in said plate, said extension including a cup crimped over said pin, a disc, and a shaft joining said cup and said disc.

3. A device for attachment to a headed pin on an artificial tooth, said device comprising a cup to receive said headed pin, a disc, and a shaft integral with and joining said cup and said disc.

EARL J. WELLS.